United States Patent Office.

CHARLES MARTIN, OF CHANCERY LANE, AND WILLIAM BARRETT AND THOMAS STAMMERS WEBB, OF NORTON, ENGLAND.

Letters Patent No. 82,539, dated September 29, 1868.

IMPROVEMENT IN THE TREATMENT AND REDUCTION OF TITANIFEROUS IRON-ORES.

The Schedule referred to in these Letters Patent and making part of the same.

TO ALL WHOM IT MAY CONCERN:

Be it known that we, CHARLES MARTIN, of Chancery Lane, in the county of Middlesex, England, and WILLIAM BARRETT and THOMAS STAMMERS WEBB, of Norton, in the county of Durham, England, have invented certain "Improvements in the Treatment and Reduction of Titaniferous Iron-Ores, for the manufacture of iron, and in the application of slag or cinder produced in such processes;" and we do hereby declare that the following is a full and exact description thereof.

Our invention chiefly relates to certain improvements in the treatment of ores containing a large percentage of titanic acid, and more especially those titaniferous ores, found in Norway and elsewhere, called "ilinenite," and which, when free from gangue or matrix, consist almost wholly of titanic acid and oxides of iron, with or without a small proportion of magnesia in combination.

The above-mentioned or differ in their chemical composition from those ordinarily used on a large scale, for the manufacture of iron in the blast-furnace, for the titanic acid they contain, and its action in the blast-furnace, have caused them to be usually considered by metallurgists as ores difficult or impossible to smelt.

For the reduction of these ores in accordance with this invention, a blast-furnace or cupola of any ordinary form is employed, the same being charged in the ordinary manner, and in the following approximate proportions: Coke, or other equivalent fuel, twenty parts; ore, (by preference broken into pieces not exceeding two inches square,) fifty parts; lime, three parts; and of the following substances, namely, silicate of manganese, silicate of iron, silicate of alumina, silicate of lime, or silicate of magnesia, either singly or in combination, four parts; or a proportion of such substances or material which would, when fused, produce the said silicates, or some or one of them, the quantity used being varied according to the amount of silicate contained in such substances or materials. The above-mentioned proportion is adapted for a substance containing thirty-five per cent. of silica and seventy-five per cent. of lime and alumina, or of approximate proportions. Any natural substances containing the required silicates may be employed, but those ores of iron or manganese which contain also silica, with or without alumina, lime, or magnesia, are preferred, provided such ores do not contain such an amount of deleterious substances, such as sulphur or phosphorus, as to affect the quality of the titaniferous pig-iron to be produced.

Among the artificial substances containing the requisite silicates, which are by preference used, may be enumerated the slag from blast or other furnaces, either before or after such slags have been wholly or partially purified by roasting and washing, or by roasting alone, or by other means hereinafter mentioned.

The silicates necessary for the proper smelting of the titaniferous ores may, indeed, be prepared in the blast-furnace itself, by charging such furnace with silicic acid, more or less impure, in the form of flint or similar materials, and any substance containing the oxides of manganese, iron, aluminium, calcium, and magnesium, which oxide or oxides will combine with the free silicic acid in the flints, or other silicious substance, and form more or less impure silicates, which will act in the manner before described.

The cinder or slag which results from the smelting of the titaniferous ores is preserved, and will, if mixed with ordinary iron-ores in smelting operations, or in remelting common pig-iron, or in puddling the same, be found to impart thereto the peculiarities and excellence of quality possessed by the metal which is obtained from the titaniferous ores themselves.

Should the quantity of sulphur in the slag be such as to be deleterious to the iron, the complete or partial purification thereof may be effected by taking the slag, by preference in a molten state, as it runs from the blast or other furnace, and mixing it with such substance or substances, either in a solid state, or in solution, as will be capable, in accordance with well-known chemical principles, of decomposing the sulphur-compound or compounds contained in the slag, and of expelling the sulphur or sulphuretted hydrogen, or other gaseous sulphur-compounds combined therewith, or of converting the sulphur or sulphur-compounds contained in the slag, by oxidation or otherwise, into soluble bodies.

For these purposes, water, hydrochloric acid, nitric acid, and solutions of chlorine, may be used, and also substances containing chlorine, such as chlorides and hypochlorides, either solid or in solution, caustic potash, caustic soda, carbonate of potash, carbonate of soda, nitrates of potash, soda, or ammonia, and also the waste liquor from stills, in which chlorine is prepared for the manufacture of bleaching-powder. These methods of purification are also applicable to the slag used in the reduction of the said titaniferous ores.

We claim—

The methods of treating and reducing titaniferous iron-ores for the manufacture of iron, and of applying the slag or cinder produced in such processes, substantially as hereinbefore described and set forth, or any mere modifications thereof.

CHARLES MARTIN,
WILLIAM BARRETT,
THOS. S. WEBB.

Witnesses to the signature of CHARLES MARTIN:
R. S. MORDAUNT VAUGHAN, 54 *Chancery Lane*,
M. WYNN, 24 *Royal Exchange, London*.

Witnesses to the signature of WILLIAM BARRETT:
ISAAC HOPPER, *Solicitor, West Hartlepool*,
HENRY I. BELL, *Clerk to the said I. Hopper*.

Witnesses to the signature of THOMAS STAMMERS WEBB:
ISAAC HOPPER,
HENRY I. BELL.